United States Patent
Deliligkas et al.

(10) Patent No.: US 12,490,338 B2
(45) Date of Patent: Dec. 2, 2025

(54) METHOD AND SYSTEM FOR EMERGENCY CALL CONTINUATION IN CASE OF A PSAP FAILURE

(71) Applicant: ATOS Public Safety, LLC, Irving, TX (US)

(72) Inventors: Athanasios Deliligkas, Wellington, FL (US); Ioannis Ganotis, Voula (GR); Gerasimos Tzanetatos, Athens (GR); Myronas Kalligeris, N. Erytrhaia (GR); Georgios Tsakiris, Koridallos (GR)

(73) Assignee: ATOS PUBLIC SAFETY, LLC, Irving, TX (US)

( * ) Notice: Subject to any disclaimer, the term of this patent is extended or adjusted under 35 U.S.C. 154(b) by 517 days.

(21) Appl. No.: 17/948,431

(22) Filed: Sep. 20, 2022

(65) Prior Publication Data

US 2023/0171847 A1   Jun. 1, 2023

(30) Foreign Application Priority Data

Nov. 30, 2021 (EP) .................................. 21211526

(51) Int. Cl.
*H04W 76/50* (2018.01)
*H04W 76/15* (2018.01)
*H04W 76/18* (2018.01)

(52) U.S. Cl.
CPC .......... *H04W 76/50* (2018.02); *H04W 76/15* (2018.02); *H04W 76/18* (2018.02)

(58) Field of Classification Search
CPC ..... H04W 76/50; H04W 76/15; H04W 76/18; H04L 65/1063; H04L 69/40; H04L 65/1083
See application file for complete search history.

(56) References Cited

U.S. PATENT DOCUMENTS

| 5,239,570 | A | * | 8/1993 | Koster | ................... | H04M 11/04 |
| | | | | | | 379/279 |
| 8,638,907 | B1 | * | 1/2014 | Schumacher | ........... | H04W 4/90 |
| | | | | | | 455/404.1 |
| 9,426,833 | B2 | * | 8/2016 | Mufti | ................... | H04L 65/1069 |
| 9,681,282 | B2 | * | 6/2017 | Gellens | ................... | H04W 4/90 |
| 2015/0092537 | A1 | | 4/2015 | Biage et al. | | |

(Continued)

FOREIGN PATENT DOCUMENTS

| EP | 2139195 A1 | 12/2009 | | |
| WO | WO-2017027058 A1 | * | 2/2017 | ......... H04L 65/1006 |
| WO | WO-2022211535 A1 | * | 10/2022 | ........ H04W 36/1443 |

OTHER PUBLICATIONS

Extended European Search Report for European Application No. 21211526.5 dated May 31, 2022.

*Primary Examiner* — Rebecca E Song
(74) *Attorney, Agent, or Firm* — Meagher Emanuel Laks Goldberg & Liao, LLP

(57) ABSTRACT

A method and system for re-establishing a disconnected emergency call to an emergency call network for emergency call continuation in case of Public Safety Answering Point (PSAP) failure(s) can be utilized without the need of any manual steps taken by the caller and/or the call taker. Embodiments can be configured to detect a failure in the PSAP operating the emergency call by a Next Generation Core Services (NGCS), which thereupon will not release the emergency call to the failed PSAP but will send it to a dynamically identified fallback PSAP.

14 Claims, 7 Drawing Sheets

(56) References Cited

U.S. PATENT DOCUMENTS

| | | | |
|---|---|---|---|
| 2015/0092610 A1* | 4/2015 | Russell | H04M 15/66 |
| | | | 370/259 |
| 2016/0379470 A1* | 12/2016 | Shurtz | H04W 4/16 |
| | | | 455/404.2 |
| 2017/0325056 A1* | 11/2017 | Mehta | H04W 4/90 |
| 2018/0302334 A1* | 10/2018 | Osterlund | H04L 47/765 |
| 2019/0200204 A1* | 6/2019 | Gross | H04W 4/025 |
| 2020/0084318 A1* | 3/2020 | Amin | H04M 7/0078 |

\* cited by examiner

METHOD AND SYSTEM FOR EMERGENCY CALL CONTINUATION IN CASE OF A PSAP FAILURE

CROSS-REFERENCE TO RELATED APPLICATIONS

The present application claims priority to European Patent Application No. EP 21 211 526.5 filed on Nov. 30, 2021. The entirety of this European patent application is incorporated by reference herein.

FIELD

The present invention relates to a method and a system for re-establishing a disconnected emergency call to an emergency call network.

BACKGROUND

Emergency calling services are a cornerstone of public safety. During the last few years, such systems are transitioning to VoIP (Voice over IP) and unified communications, and are continuously evolving under the umbrella of organizations, including the National Emergency Number Association (NENA) and the European Emergency Number Association (EENA). The outcome of this effort is the Next Generation 911 (NG911) or the Next Generation 112 (NG112) services operating over the so-called Emergency Services IP network (ESInet).

SUMMARY

Emergency calling services allow every citizen to contact experienced professionals which reside on a Public Safety Answering Point (PSAP) side to communicate the details of an emergency incident and get help from first responders. The PSAPs comprise one of the most important elements of the NG911 architecture. This holds true for two main reasons. The first one relates to the positioning of these elements in the ESInet, and the second one to the fact that they host the actual trained professionals that will answer an emergency call. In this respect, it becomes apparent that the efficient selection, along with providing accurate data of the appropriate PSAP that will handle the emergency call, is very important for the overall handling of the emergency incident.

One problem that we have identified that can occur during an emergency call is a disconnection of the emergency call between the caller and the call taker, for example due to a failure of a component in the communication path, for instance the PSAP call process equipment. To re-establish the call, the call taker could redial the caller's number, but this requires time that may not be available in an emergency. In addition, to re-establish the call, other conditions must be met, such as the caller hanging up the original call and/or then answering the phone. Thus, manual steps are required by the caller and call taker for a disconnected call to get reconnected again. Other possibilities for reconnecting disconnected emergency calls described in the art focus on redundancy and failover concepts inside the PSAP. The concept is mainly that when an equipment fails there will be a redundant server that shares some part of the call state and as such the redundant server can take over.

U.S. Pat. No. 9,907,096 B2 for example describes a system, method and apparatus for re-establishing a video call received at a public safety answering point. A Session Initiation Protocol (SIP) video call establishment request is received at an emergency call answer node. The video call establishment request has an indication of a previously established emergency messaging session between an operator workstation and a sending device to re-establish. The emergency call answer node checks a recovery queue for a previously received call establishment request having a matching indication for the previously established video call to re-establish. The emergency call answer node bridges a session leg for the received call establishment request and a session leg for the previously received call establishment request having the matching indication for the previously established messaging session to re-establish the messaging session when a match is found.

Said approaches for re-establishing an emergency call have various limitations. One limitation is that redundancy is offered inside the PSAP, so if there are connectivity problems with the PSAP from the emergency network, or if a catastrophic failure occurs in the PSAP itself, those approaches will not work in a NG911/NG112 environment. Such a catastrophic failure could be, for example, an earthquake, a terrorist attack, or other incidents that may cause the PSAP to become unreachable and unrecoverable, e.g. by losing the internet connectivity to necessary systems. Another limitation is that such approaches usually lack the ability to scale when considering more than one PSAP.

Thus, the information that needs to be shared among the PSAPs will make said approaches quite complex and expensive. Finally, overloads can only be handled if the whole system is designed to handle 200% of the predicted maximum load so that when one of the components fails, the redundant component can take over all the traffic alone. This means that such approaches are expensive as they require double the number of components to address the redundancy needs. Usually, a fully redundant system shares the state of all established calls with the failover equipment so that a call can continue without any problems from the redundant system. However, such a functionality cannot be scaled to cover all possible PSAPs.

We have developed embodiments of methods, communication systems, and communication apparatuses that can be adapted to overcome the limitations of the state of the art and to provide or facilitate a method for emergency call continuation after a failure occurred which does not require any manual steps by the caller and/or the call taker.

In order to address the technical problem in a way that also satisfies the limitations of existing approaches and also taking into consideration the ESInet architecture, embodiments can be adapted to provide a method for re-establishing an emergency call after PSAP failure(s) through a different PSAP but using the same call taker with the same SIP end device (e.g. smartphone, laptop computer, tablet, personal computer, telephone, etc.), which also has to re-register to the failover PSAP equipment (also called fallback PSAP in the present description), and a corresponding system for conducting the inventive method. In the state of the art, it is assumed that the registration status is shared among all the redundant equipment. This existing solution cannot scale to include any dynamically designated fallback PSAP as this would require that the registration state is shared among all possible PSAPs in the network. Embodiments of our method, apparatus, and system, on the contrary, can be based on the ESInet architecture and not just the PSAP. Embodiments can be adapted to go beyond typical geographical redundancy schemes of the prior art and take advantage of the existence of multiple PSAPs to address the redundancy concept. Embodiments can be employed dynamically and resources can be allocated based on needs. This way it is not necessary to create separate data centers for each PSAP. To cover the failover concept, a re-routing of the failed call to another PSAP can be provided instead of trying to address the redundancy in the same PSAP which will be complex and requires bigger investment from the PSAPs.

Additionally, the invention addresses a total PSAP outage. The failover PSAP can be dynamically determined based on current configured rules. If the failover PSAP is unavailable or overloaded, then a next failover PSAP will be chosen. In this way a chain of failover PSAPs is created. According to the invention, if the fallback registration of the end device occurs after the call is put on a normal emergency queue or directed to another call taker then the initial call taker will also join the call to provide the necessary emergency support since said call taker is aware of the incident already.

For example, embodiments adapted for emergency call continuation in case of PSAP failure(s) are provided which can include detecting a failure in the PSAP operating the emergency call by a device of the Next Generation Core Services (NGCS) which thereupon will not release the emergency call to the failed PSAP but will send it to a dynamically identified fallback PSAP. Similarly, the call taker's (e.g. agent's) device after detecting a failure can register on the same fallback PSAP and will receive the emergency call so that the emergency caller can continue the emergency session with the same call taker. A chain of PSAPs can be created so that each PSAP can fail over to another PSAP and as a result the whole network of PSAPs in a NG911/NG112 environment can be available as a failover destination in case any one of the PSAPs fails, without the need of any manual actions done by the caller and/or the call taker.

For example, a method for emergency call continuation in case of PSAP failures in an emergency network is provided that can include detecting, by one or more detector elements, a failed PSAP, triggering, by a logic element of the one or more detector elements, a failover event when the failed PSAP is detected, requesting, by the one or more detector element, a fallback PSAP, from a fallback server, identifying, by the fallback server, a fallback PSAP, responding, by the fallback server, the identified fallback PSAP to a NGCS and all end devices of the failed PSAP, if these are available, sending, by the NGCS, all calls that were active on the failed PSAP to the identified fallback PSAP, re-registering, by the end devices, if these are available, that were registered at the failed PSAP on the identified fallback PSAP, and matching those calls that were active on the failed PSAP with those end devices that were assigned to said calls on the failed PSAP and have re-registered on the identified fallback PSAP.

According to a preferred embodiment, the failure of the PSAP can include one or more of (a) a problem in the network connection between the NGCS and the PSAP, (b) a problem in the PSAP datacenter and/or (c) a problem in the connection between the PSAP and the end device.

There are at least three possible failures that could happen that could trigger a failover procedure. A first problem lies in the network connection between the NGCS and the PSAP. A second problem lies in the PSAP datacenter (or a major failure of the Border Control Function (BCF) inside the datacenter). The third problem lies in the connection between the PSAP and the agent's device. The first and second problem could be identified by the NGCS either using SIP OPTIONS messages or by detecting the interruption in the Real-Time Transport Protocol/Secure Real-Time Transport Protocol (RTP/SRTP) stream. The third problem could be identified by the PSAP equipment and is able to indicate the NGCS that there is a problem with the connection and trigger the failover. This can be done by stopping to reply to SIP OPTIONS messages for example, by the usage of the i3 subscribe/notify mechanism as described by NENA and/or if none of the above is available, the Private Branch Exchange (PBX) in the PSAP can implement a method to send a SIP INFO message specifically to this functionality. Similarly, the NGCS could implement a logic element to trigger the PSAP failover functionality when receiving the specific SIP INFO message. Further, the first problem may also be identified by the PSAP equipment which implements a similar SIP INFO message as described for the NGCS, which could indicate to the end device that the connection is lost and that the PSAP failover functionality must be triggered. Similarly, the agent's device may implement a logic element of triggering a PSAP failover upon receiving the specific SIP INFO message. If the end user device loses connectivity to the PSAP either because the PSAP is down or the connection between the PSAP and the device is lost without the possibility to reconnect, then the device will identify the failure (the fact that it cannot connect anymore to the PSAP) and trigger the PSAP failover functionality. In general, the failure could also be detected using session timers for both the Next Generation Core Services (NGCS) and the end user device for all failure problems.

According to another preferred embodiment, the detector element is a NGCS or one or more end devices. The end device can also be called agent's device, call taker's device, or user end device (UE). Examples of an end device or UE can include a smartphone, a telephone, a laptop computer, a tablet, or a personal computer. Such devices include hardware, which can include a processor connected to a non-transitory memory, at least one transceiver unit (e.g. Ethernet card, wireless network card, local area network card, wireless network transceiver unit, etc.). Such devices can also include or be communicatively connected to at least one input device, at least one output device and/or at least one input/output device connected to the memory and the processor (e.g. a touchscreen, one or more buttons, a keyboard, a pointer device, etc.).

The detector element can be a component of the NGCS and also be a type of communication device or computer device (e.g. a server or other type of computer device). Such a detector element can include a processor connected to a non-transitory memory, at least one transceiver unit (e.g. Ethernet card, wireless network card, local area network card, wireless network transceiver unit, etc.). Such devices can also include or be communicatively connected to at least one input device, at least one output device and/or at least one input/output device connected to the memory and the processor (e.g. a touchscreen, one or more buttons, a keyboard, a pointer device, etc.).

It should be appreciated that each PSAP can include a computer device. The PSAP can include a processor connected to a non-transitory memory, at least one transceiver unit (e.g. Ethernet card, wireless network card, local area network card, wireless network transceiver unit, etc.). Such devices can also include or be communicatively connected to at least one input device, at least one output device and/or at least one input/output device connected to the memory and the processor (e.g. a touchscreen, a monitor or liquid crystal display, one or more buttons, a keyboard, a pointer device, etc.).

It should also be appreciated that a fallback server is a type of machine or computer device. The fallback server can include a processor connected to a non-transitory memory, at least one transceiver unit (e.g. Ethernet card, wireless network card, local area network card, wireless network transceiver unit, etc.). Such devices can also include or be communicatively connected to at least one input device, at least one output device and/or at least one input/output device connected to the memory and the processor (e.g. a touchscreen, a monitor or liquid crystal display, one or more buttons, a keyboard, a pointer device, etc.).

According to still another preferred embodiment, the step of detecting a failed PSAP is conducted by the NGCS and/or the one or more end device.

Further, according to a preferred embodiment, the step of detecting a failed PSAP by the NGCS is performed by using at least one of SIP OPTIONS messages, detecting an interruption in the RTP/SRTP stream or SIP INFO messages.

According to yet another preferred embodiment, the step of detecting a failed PSAP, by the one or more end device, is performed by using at least one of detecting a connectivity failure with the PSAP equipment on the media or signaling interface or SIP INFO messages for the PSAP. Therefore, the device will either get a SIP INFO message for the PSAP (in case of NGCS connection failure) or will detect a connectivity failure with the PSAP equipment on the media or signaling interface.

According to yet another preferred embodiment, a SIP-URI of the fallback PSAP for each PSAP is described in PSAP PRF policies. Thus, the fallback server could fetch those policies to deduct the fallback PSAP for each PSAP for emergency calls. This process allows for the dynamic configuration of the fallback PSAP SIP-URI for each PSAP as this can change at any time. Additionally, the fallback PSAP that is chosen for a specific PSAP is also a normal PSAP and can have on its own another fallback PSAP. This way a virtual chain of fallback PSAPs can be created. Thus, when a PSAP fails, the fallback PSAP will be retrieved by the policies and if this PSAP has also failed, the fallback PSAP of that second PSAP will be chosen. This will repeat until an available PSAP has been identified. During this procedure, overloaded PSAPs that cannot handle any more traffic will also be considered as failed PSAPs until a non-failed PSAP is chosen.

However, the SIP registrar address that is needed for the agent's device to register on the fallback PSAP will not be stored in the PSAP policy or may not be stored in the PSAP policy so this can be stored in the fallback server itself.

Thus, according to yet another preferred embodiment, the fallback server comprises a record that matches a retrieved SIP-URI of a PSAP from the PSAP policies with the SIP registrar of that PSAP. The SIP-URI can be a uniform resource identifier.

According to yet another preferred embodiment, the SIP-URI and the SIP registrar of the fallback PSAP are stored as one record in the fallback server and on request either the SIP-URI and/or the SIP registrar are returned.

According to yet another preferred embodiment, a configuration interface can be used to configure the SIP-URI and SIP registrar of the fallback PSAP and/or to configure the fallback PSAP for each PSAP. For example, a user interface (UI) or an Application Programming Interface (API) on the fallback server (such as a web interface or a HTTP REST API) can be used. Through this interface it will be possible to describe the necessary information depending on the implemented solution. The information can be stored locally on the fallback server and can be able to change on demand.

However, the identification of the fallback PSAP can be done through a configuration interface of the fallback server alone or with the combination of using policies. The NGCS when requesting the fallback PSAP for a PSAP that failed from the fallback server will at the end use a SIP-URI to route failed calls to the fallback PSAP. On the other hand, the agent's device that registers on the fallback PSAP after a failure may use an IP address or FQDN/DNS (Fully Qualified Domain/Domain Name System) address to find the fallback PSAP to register to. The SIP interface for incoming calls to a PSAP and the SIP interface for registering the agent's device may be different. They could even be on a different network.

As mentioned, it is assumed that the fallback PSAP information contains both the fallback PSAP SIP-URI for routing emergency calls and the fallback PSAP SIP Registrar address for being able to register the agent's device.

If policies are used to decide on the fallback PSAP for each PSAP then in addition a lookup table or record on the fallback server to match the SIP-URI of the fallback PSAP with the fallback PSAP SIP Registrar address may be used.

If policies are not used to decide but instead this configuration is done on the fallback PSAP itself, then both the fallback PSAP SIP-URI and the fallback PSAP SIP Registrar address will be configured as a single record that contains the necessary information for each (fallback) PSAP.

This way when the NGCS requests the fallback PSAP from the fallback server it will receive a SIP-URI but when a device requests the fallback PSAP from the fallback server it will receive the fallback PSAP SIP Registrar address.

According to yet another preferred embodiment the step of identifying a fallback PSAP for the failed PSAP is repeated in case the next available PSAP is also considered a failed PSAP. After PSAP failure detection by the at least one detector element, a fallback PSAP is identified for the failed PSAP. If said fallback PSAP is available, routing information for the fallback PSAP is provided. In case the fallback PSAP is not available, it is considered a failed PSAP and the identification of a fallback PSAP for the failed PSAP is repeated. A logic element may be used by the NGCS to identify the next available fallback PSAP. For identification of the fallback PSAP, the NGCS requests a fallback PSAP for the failed PSAP from the fallback server. This fallback server may be located in a demilitarized (DMZ) zone so as to be accessible through the public internet and thus also through the end device. The fallback server responds to the NGCS's request with a fallback PSAP for the failed PSAP. Also, the end device may query the fallback server using a specific Application Programming Interface (API) that can provide the fallback PSAP since the end device is not part of the NGCS network. The logic element which may be implemented by the fallback server must be the same as the one used by the NGCS to identify the fallback PSAP if such a logic element is implemented there. To this end, either the NGCS may use a similar but internal API to the fallback server or it may implement the same logic as the fallback server. The NGCS after detecting a PSAP failure and identifying the fallback PSAP using the steps described above, sends all emergency calls that were active on the failed PSAP to the fallback PSAP. The emergency calls that were also sent to the failed PSAP but were still in the queue and not answered by an agent can be requeued to a different PSAP.

According to yet another preferred embodiment the calls which are send, by the NGCS, to the identified fallback PSAP all carry a call-info header comprising an emergency call-ID and an incident call-ID.

According to yet another preferred embodiment the NGCS can add a history-info header for those calls that were active on the failed PSAP, wherein the history-info header indicates that said calls were active and have been sent to the identified fallback PSAP. Said calls carrying the history-info header will be sent immediately to the same end device if said device has re-registered to the fallback PSAP after the previous PSAP has failed.

According to yet another preferred embodiment the step of matching the calls with the one or more end device is performed by using the emergency call-ID and the incident call-ID. If the call arrives at the fallback PSAP with a history-info header but after some pre-determined time (for example, 1 second) in which no device with the same emergency call-ID and incident call-ID has registered, the call can be requeued to the fallback PSAP to be handled by another agent. If the end device with the same emergency call-ID and incident call-ID registers after the call is queued, the call is sent directly to this end device. If the end device with the same emergency call-ID and incident call-ID registers after the call is answered by another agent, a conference call is created with the other PSAP agent that answered said emergency call in the fallback PSAP and the initial PSAP agent using this end device.

According to yet another preferred embodiment the one or more end device uses a SIP REGISTER message to re-register on the identified fallback PSAP.

According to the invention, a system for emergency call continuation in case of PSAP failures in an emergency network is provided, wherein the system is configured to perform the method according to any one of the claims 1 to 12.

According to yet another preferred embodiment the system comprises one or more detector element, a logic element as part of the one or more detector element, a fallback server and/or a fallback PSAP.

Embodiments of communication apparatuses and communication systems are also provided. Such embodiments can be configured to utilize one or more embodiments of the above discussed methods, for example. Such embodiments can include one or more of the end device, detector element, NGCS, PSAP(s), and/or other devices.

Other details, objects, and advantages of the telecommunications apparatus, system, device, and method will become apparent as the following description of certain exemplary embodiments thereof proceeds.

BRIEF DESCRIPTION OF THE DRAWINGS

The invention and embodiments thereof will be described below in further detail in connection with the drawings. The various embodiments and/or their individual sub-items and features can be combined with each other in any logical way. Even if some of the embodiments are described on the basis of a particular type of network architecture, they are explicitly not limited to them but can also be applied to other networks or communication system architecture as well. The drawings include.

DETAILED DESCRIPTION

Figure 1:
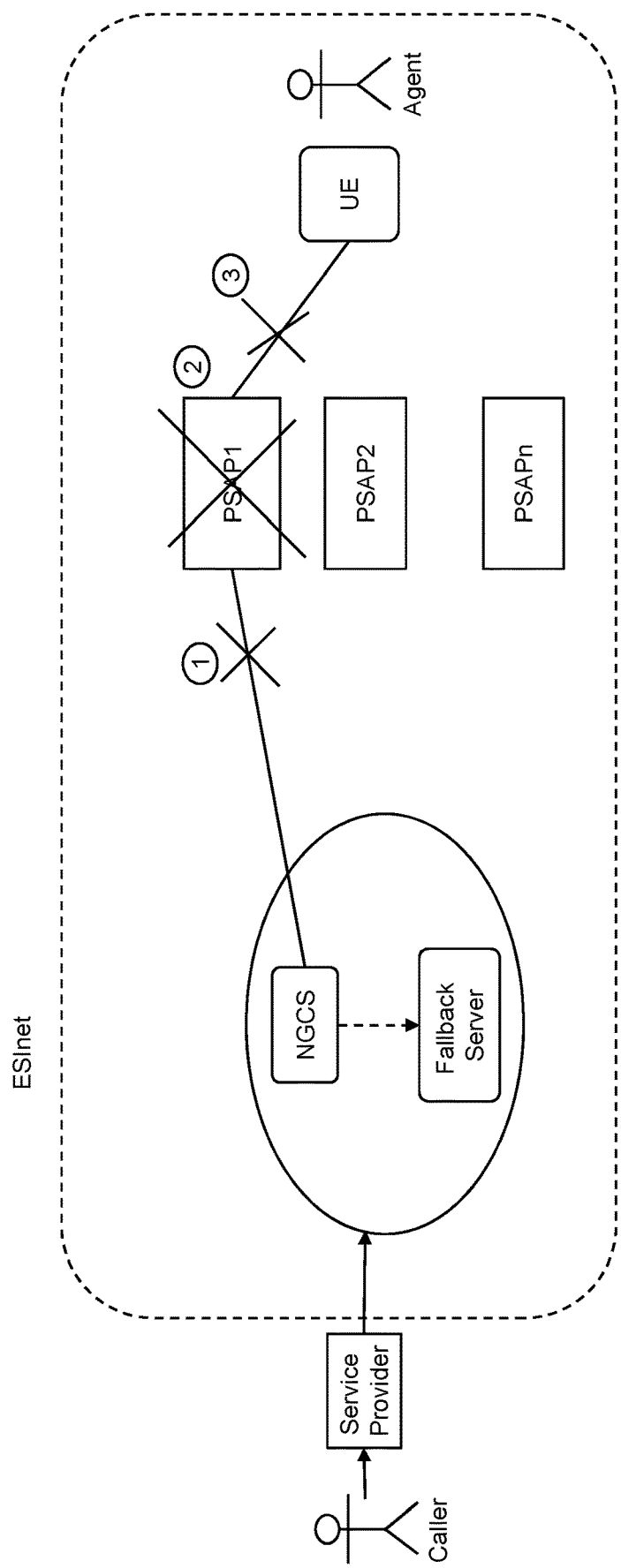
FIG. 1 shows a schematic illustration of possible PSAP communication failures according to an embodiment of the invention.

FIG. 1 schematically shows possible PSAP communication failures. A caller is shown who is or will be connected to the emergency call network, e.g. ESInet, via a service provider. The emergency network comprises a NGCS, a fallback server connected to it and several PSAPs which in turn have user end devices with which the call taker or agent of the respective PSAP can communicate with a caller. This architecture may cause various failures that require a reconnection between the caller and the call taker. There are three possible failures that could happen that could trigger a failover. One is a problem in the network connection between the NGCS and the PSAP (1). The second is a problem in the PSAP datacenter (or major failure of the Border Control Function (BCF) inside the datacenter, 2). The third is a problem in the connection between the PSAP and the agent's device (3).

It should be appreciated that each of the fallback server, PSAP, and end devices of the call taker and caller are types of machines. Each of these devices include a processor connected to a non-transitory memory, at least one transceiver unit (e.g. Ethernet card, wireless network card, local area network card, wireless network transceiver unit, etc.). Such devices can also include or be communicatively connected to at least one input device, at least one output device and/or at least one input/output device connected to the memory and the processor (e.g. a touchscreen, a monitor or liquid crystal display, one or more buttons, a keyboard, a pointer device, etc.).

A detector element of the NGCS that may detect a PSAP failure can also be a type of machine that includes a processor connected to a non-transitory memory, at least one transceiver unit (e.g. Ethernet card, wireless network card, local area network card, wireless network transceiver unit, etc.). Such devices can also include or be communicatively connected to at least one input device, at least one output device and/or at least one input/output device connected to the memory and the processor (e.g. a touchscreen, a monitor or liquid crystal display, one or more buttons, a keyboard, a pointer device, etc.).

Figure 2:
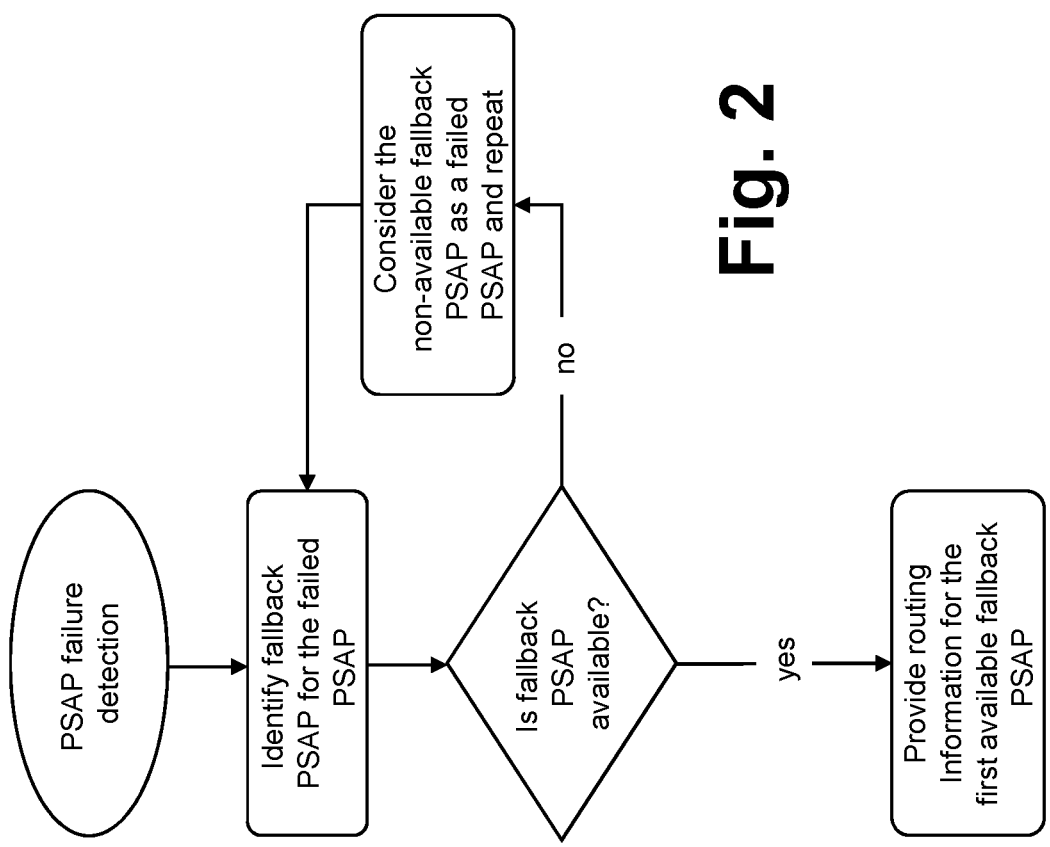
FIG. 2 shows a flowchart of the method for identifying the fallback PSAP according to another embodiment of the invention.

FIG. 2 shows in another embodiment of the invention a flowchart of a logic element for identifying a fallback PSAP. After PSAP failure detection, a logic element of a one or more detector elements triggers a failover event by which a fallback PSAP for the failed PSAP is identified. If said fallback PSAP is available, routing information is provided. If said fallback PSAP is not available, it is also considered a failed PSAP, and the identification of another fallback PSAP is repeated. The repeated processing of the identification of another fallback PSAP can be managed using policy rules and/or policy routing functions (PRF) in order to send the emergency call to the proper fallback PSAP. Thereby, a SIP-URI of the fallback PSAP for each PSAP is described or stored in the PSAP PRF policies. Thus, the fallback server could fetch those policies to deduct the fallback PSAP for each PSAP for emergency calls. However, the SIP registrar address that is needed for the agent's device to register on the fallback PSAP will not be stored in the PSAP policy and so this needs to be stored in the fallback server itself. Thus, the fallback server comprises a record that matches a retrieved SIP-URI of a PSAP from the PSAP policies with the SIP registrar of that PSAP. The SIP-URI and the SIP registrar of the fallback PSAP can be stored as one record at the fallback server and on request either the SIP-URI or the SIP registrar or both will be returned. A user interface (UI) can be used to configure the SIP-URI and SIP registrar of the fallback PSAP and/or to configure the fallback PSAP for each PSAP.

Figure 3:
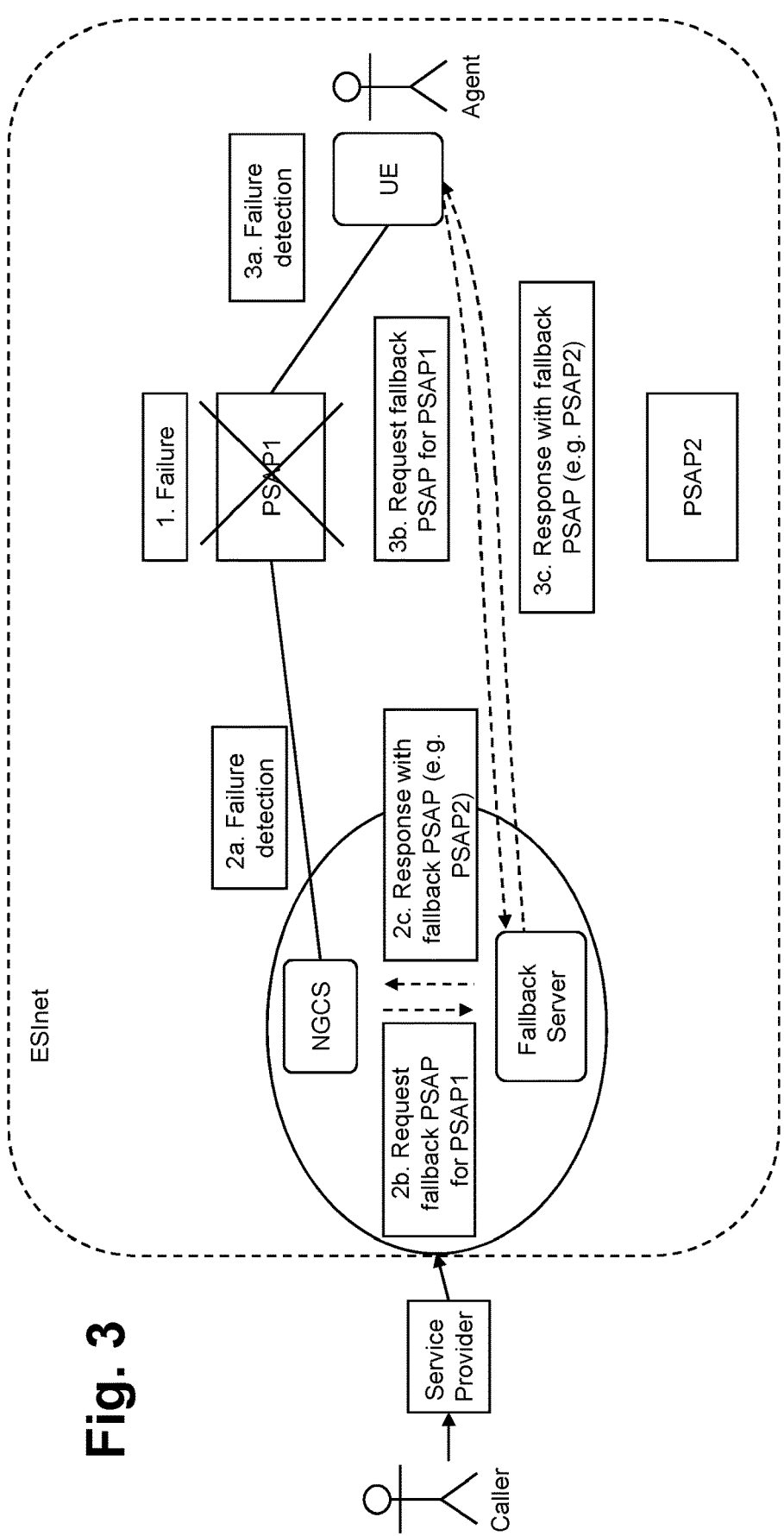
FIG. 3 shows a schematic illustration of the method for identifying the fallback PSAP according to another embodiment of the invention.

FIG. 3 depicts the method according to another embodiment of the invention schematically. After a caller has initiated a call to the emergency network via a service provider a PSAP fails (step 1). This failure is detected by the NGCS (step 2a), which in turn requests a fallback PSAP for the failed PSAP through the fallback server (step 2b). If the fallback PSAP is available, the NGCS gets a response from the fallback server indicating the available PSAP (PSAP2, step 2c). The failed PSAP is also detected by the agent's device (UE, step 3a), which in turn requests a fallback PSAP for the failed PSAP through the fallback server (step 3b) and gets a response with the fallback server indicating the same fallback PSAP (PSAP2, step 3c).

Figure 4:
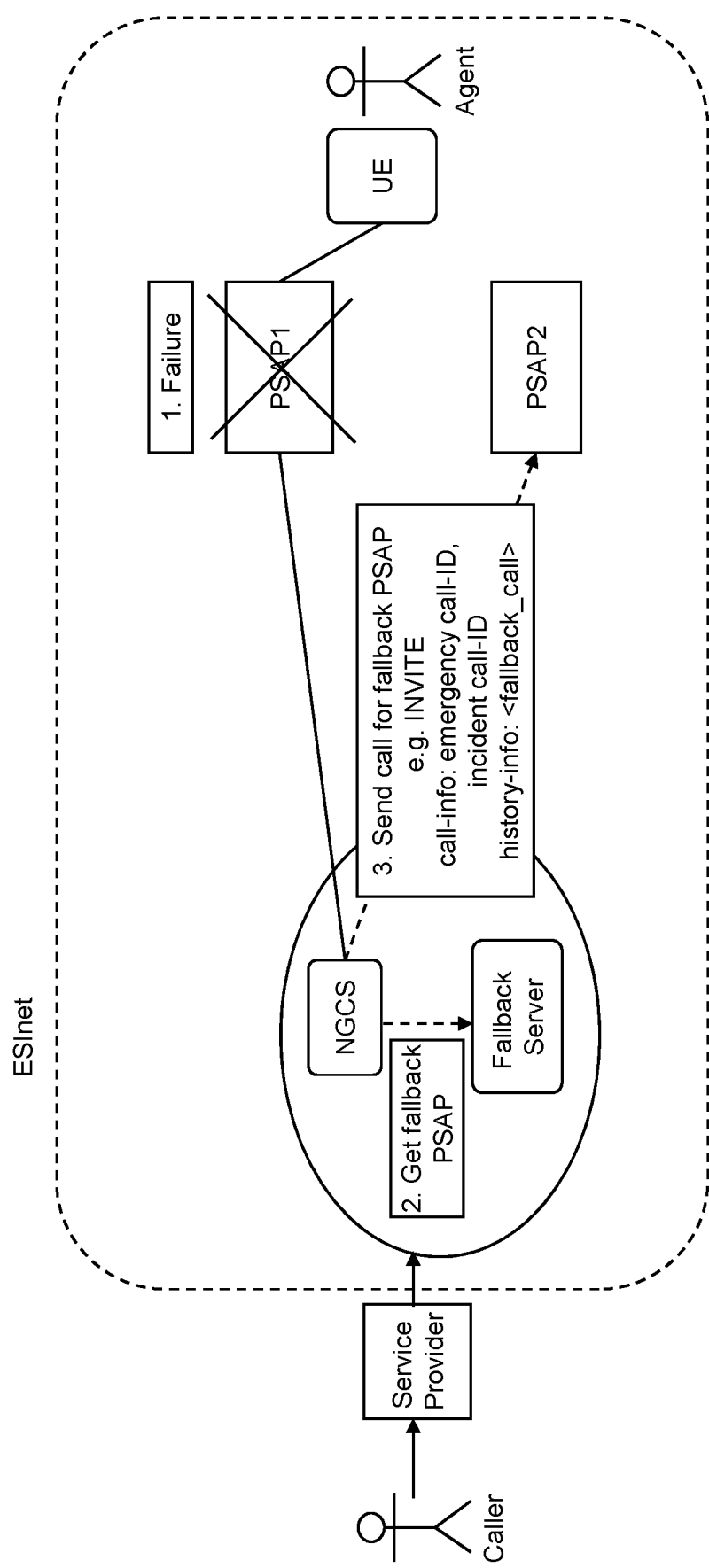
FIG. 4 shows a schematic illustration of sending a SIP INVITE message to the fallback PSAP according to another embodiment of the invention.

In FIG. 4, the inventive method for setting up a new call from a NGCS is depicted according to another embodiment of the invention. In case of a PSAP failure, a NGCS requests a fallback PSAP from the fallback server as already described above in FIG. 3. After the NGCS gets a response from the fallback server indicating an available fallback PSAP (PSAP2), it sends an INVITE message to said fallback PSAP including the call-info header with the emergency call-ID and the incident call-ID of the disconnected call. Furthermore, an INVITE massage may also comprise the history-info header which can be necessary for knowing that a certain call was already established in another PSAP.

Figure 5:
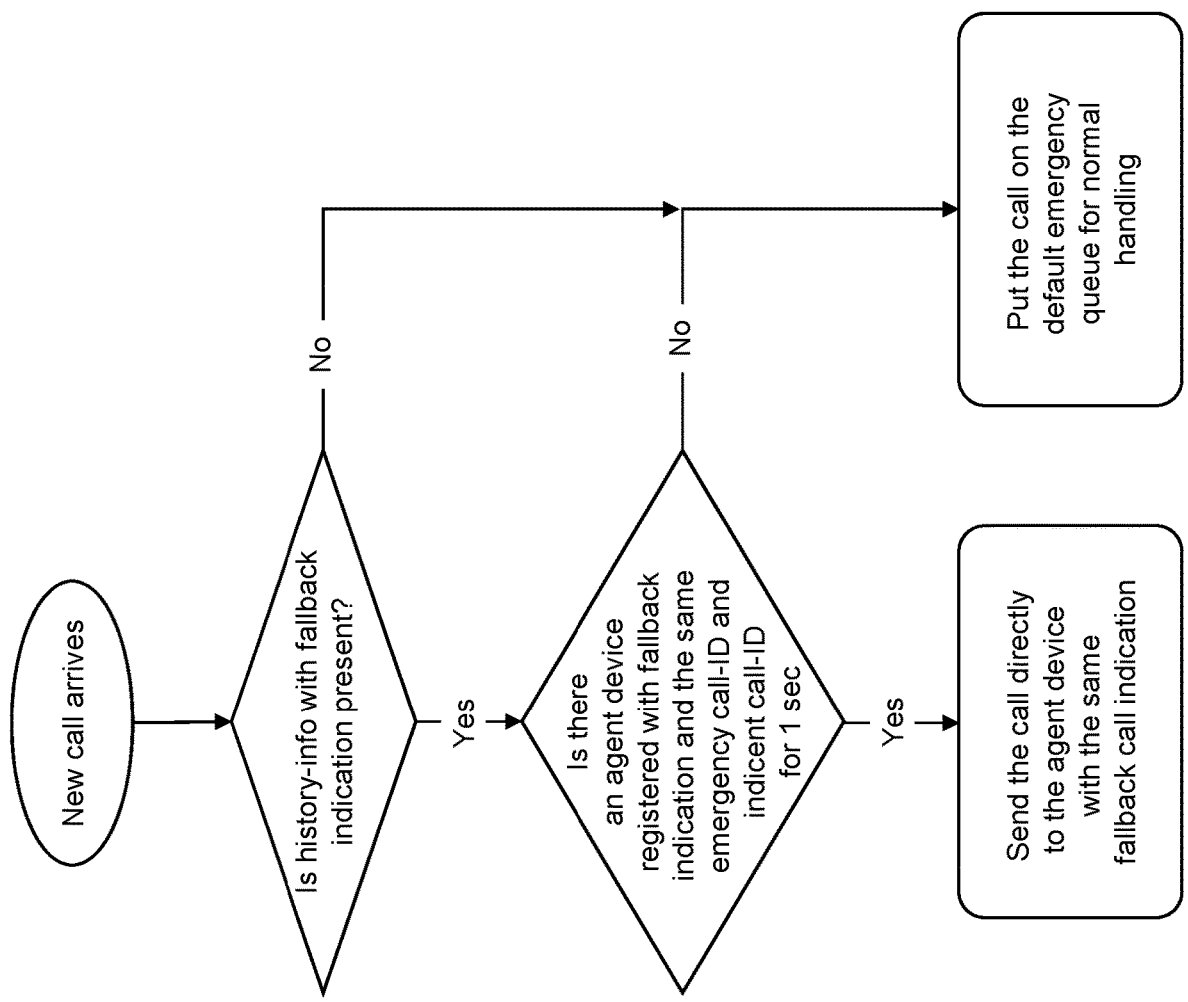
FIG. 5 shows a flowchart of the method for the call arrival logic according to another embodiment of the invention.

FIG. 5 is a flowchart, depicting a setup of a new call according to another embodiment of the invention. If a new emergency call arrives at a fallback PSAP, a logic element checks whether the history-info header of said call including a fallback indication is present. If so, the fallback PSAP reassesses whether an end device carrying the same history-info header as the newly arrived call has registered on the fallback PSAP. If this is the case, the arrived call is sent directly to said end device. In case no history-info header is present on the new call, said call is put in the default emergency queue for normal handling. This is also true for calls which do carry a history-info header but no end device with the same history-info header has registered on the fallback PSAP.

Figure 6:
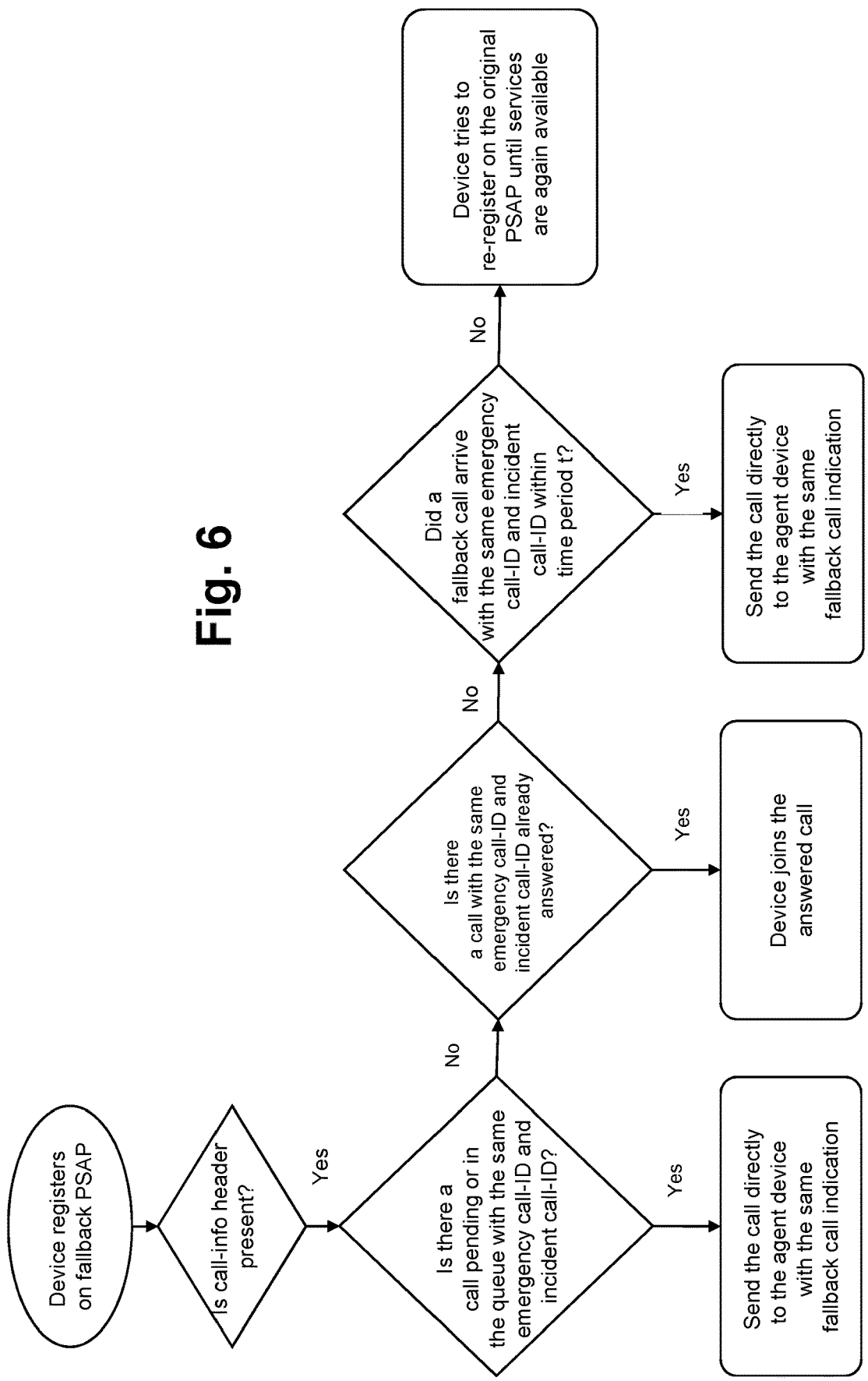
FIG. 6 shows a flowchart of the method for the device fallback registration follow-up logic according to another embodiment of the invention.

The flowchart of FIG. 6 depicts the steps of the fallback registration by an end device according to another embodiment of the invention. In the first step, an end device registers on the fallback PSAP. The fallback PSAP checks whether a call-info header is present. If this is not the case, other emergency calls which are in queue may be distributed to said end device, however this may be difficult to achieve, since it is very likely that the agent will not be able to start working as a full member of a different PSAP. This means it will not be easy for the agent to start receiving calls as it will not be evident that the agent will have access to all necessary systems and the appropriate training for all other PSAPs. Each PSAP may have different technology and training to use that technology and the agent may not be able to login to the necessary systems to do her/his job properly. Thus, it is preferred that the agent only registers to the fallback PSAP for the failed call. Therefore, the SIP interface is used for establishing emergency voice/video calls. In this case it is assumed that the agent's device will be able to register on the fallback PSAP, the network path/connectivity is available and specific interfaces can be used for registering. In case a call-info header is present, the next step is to check whether there is a call pending or in queue with the same emergency call-ID and incident call-ID. If this is the case, the call is sent directly to the end device carrying the same fallback call indication. If no match is found, it will be checked if a call with the same call-info header has already been answered by another end device. If so, the end device joins the answered call for a conference call. If this is not the case, after a few seconds when a fallback call carrying the same call-info header arrives, said call is send directly to the end device carrying the same fallback call indication. If no fallback call arrives with the same emergency call-ID and incident call-ID then the agent's device tries to re-register on the original PSAP until services are available again. The fact that the agent cannot connect to the fallback emergency call for whatever reason means that there is no longer any use for this type of solution and the agent should revert to his previous state waiting to rejoin the PSAP he/she is part of. However, this last decision can be handled on time base, for example, it can be configurable how long an agent will wait on the fallback PSAP, e.g. a preconfigured time period t can be established which may reach from a few seconds to minutes. Finally, in case that the failover call is reestablished, the agent's device which temporarily registered on the fallback PSAP may try to reregister on the original PSAP as it will no longer be needed. It really depends if the agent can fully operate on the fallback PSAP as a normal agent and receives calls and stays there. Or, in case the agent is not able to become a full PSAP member on the fallback PSAP then after the fallback call terminates the agent may try to re-register back on the original PSAP when it comes back online.

Figure 7:
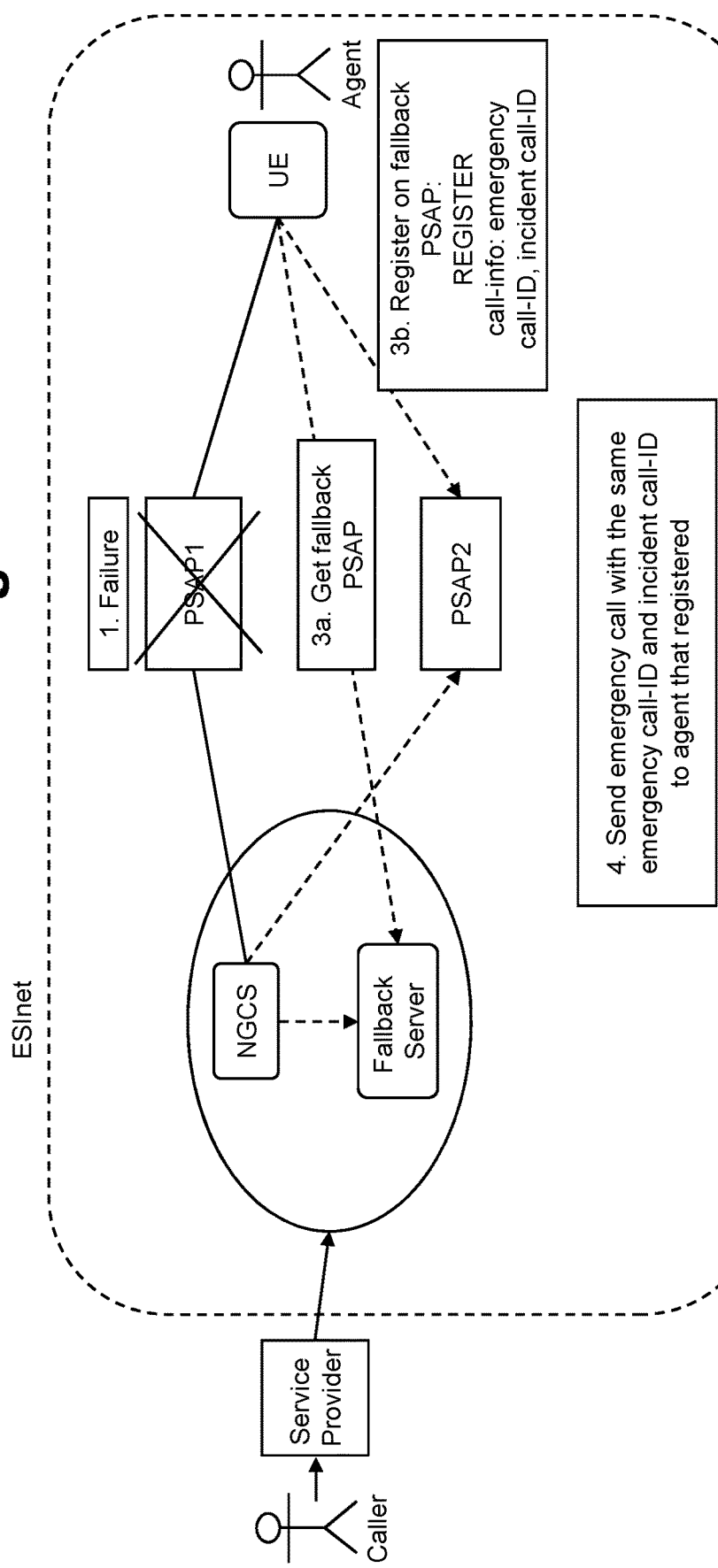
FIG. 7 shows a schematic illustration of the device fallback registration flow according to another embodiment of the invention.

FIG. 7 is a schematic illustration showing the end device registering on the fallback PSAP according to another embodiment of the invention. The user end device (UE), upon detecting a PSAP failure and getting from the fallback server the next fallback PSAP (step 3a), will re-register on a fallback PSAP using a SIP REGISTER message with a call-info header indicating the emergency call-ID and the incident call-ID of the call it was handling at the time of failure (step 3b). The fallback PSAP (PSAP2) will send an emergency call, carrying the same emergency call-ID and incident call-ID to the registered end device (step 4).

It should be appreciated that different embodiments of the method, communication system, and communication apparatus can be developed to meet different sets of design criteria. For example, the particular type of network connection, server configuration or client configuration for a device for use in embodiments of the method can be adapted to account for different sets of design criteria. As yet another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of a telecommunication apparatus, telecommunication device, terminal device, a network, a server, a communication system, and methods of making and using the same have been shown and described above, it is to be distinctly understood that the invention is not limited thereto but may be otherwise variously embodied and practiced within the scope of the following claims.

What is claimed is:

1. A method for emergency call continuation in case of a Public Safety Answering Point (PSAP) failure in an emergency network, the method comprising:
   detecting, by one or more detector elements, a failed PSAP;
   triggering, by the one or more detector elements, a failover event when the failed PSAP is detected;
   requesting, by the one or more detector elements, a fallback PSAP, from a fallback server;
   identifying, by the fallback server, a fallback PSAP;
   responding, by the fallback server, the identified fallback PSAP to a Next Generation Core Services (NGCS) and all end devices of the failed PSAP, that are available;
   sending, by the NGCS, all calls that were active on the failed PSAP to the identified fallback PSAP;
   re-registering, by the end devices, that are available and that were registered at the failed PSAP on the identified fallback PSAP, and
   matching those calls that were active on the failed PSAP with those end devices that were assigned to said calls on the failed PSAP for re-registering them on the identified fallback PSAP.

2. The method of claim 1, wherein the failure of the PSAP comprises a problem in a network connection between the NGCS and the PSAP, a problem in the PSAP datacenter and/or a problem in a connection between the PSAP and the end device.

3. The method of claim 1, wherein the one or more detector elements include a device of the NGCS and/or one or more end devices.

4. The method of claim 3, wherein the detecting of the failed PSAP is conducted by the device of the NGCS and/or the one or more end devices.

5. The method according to claim 4, wherein the detecting of the failed PSAP by the device of the NGCS is performed by using at least one of SIP OPTIONS messages, detecting an interruption in the RTP/SRTP stream or SIP INFO messages.

6. The method according to claim 4, wherein the detecting of the failed PSAP by the one or more end devices is performed by using at least one of detecting a connectivity failure with the PSAP equipment on the media or signaling interface or SIP INFO messages for the PSAP.

7. The method of claim 1, wherein a uniform resource identifier (URI) of the fallback PSAP is described in PSAP policy routing function policies and the fallback server comprises a record that matches a retrieved URI of a PSAP from the PSAP PRF policies with a registrar of that PSAP.

8. The method of claim 7, wherein the URI is a session initiation protocol (SIP) URI and the registrar of the fallback PSAP is an SIP registrar, the SIP URI and an identification of the registrar being stored as one record in the fallback server so that, when requested, either the SIP-URI and/or the registrar are returned in response to that request.

9. The method of claim 1, comprising:
   identifying another fallback PSAP for the failed PSAP in response to determining that the identified fallback PSAP is also a failed PSAP.

10. The method of claim 1, wherein the calls which are sent by the NGCS to the identified fallback PSAP all carry a call-info header comprising an emergency call-ID and an incident call-ID.

11. The method of claim 10, wherein the matching of the calls with the end devices that were assigned to said calls is performed by using the emergency call-ID and the incident call-ID.

12. The method of claim 1, comprising:
   the NGCS adding a history info header for those calls that were active on the failed PSAP, wherein the history info header indicates that said calls were active and have been sent to the identified fallback PSAP.

13. The method of claim 1, comprising:
   the one or more end device using a SIP REGISTER message to re-register on the identified fallback PSAP.

14. A system for emergency call continuation in case of a Public Safety Answering Point (PSAP) failure in an emergency network, comprising:
   one or more detector elements configured to detect a failed PSAP, trigger a failover event when the failed PSAP is detected, and request a fallback PSAP from a fallback server to initiate sending of all calls that were active on the failed PSAP to the identified fallback PSAP,
   the fallback server configured to respond the identified fallback PSAP to a Next Generation Core Services (NGCS) and all end devices of the failed PSAP, that are available,
   the NGCS, configured to send all calls that were active on the failed PSAP to the identified fallback PSAP;
   the identified fallback PSAP configured to re-register end devices associated with those calls that were registered at the failed PSAP, and to match those calls that were active on the failed PSAP with those end devices that were assigned to said calls on the failed PSAP for re-registering them on the identified fallback PSAP;
   wherein each of the one or more detector elements comprises hardware that includes a processor connected to a non-transitory computer readable medium.

* * * * *